United States Patent [19]
Leitner et al.

[11] Patent Number: 6,113,173
[45] Date of Patent: Sep. 5, 2000

[54] TRUCK BED EXTENDER

[75] Inventors: Horst Leitner, Laguna Beach; Jonathan E. Weisel, Norco, both of Calif.

[73] Assignee: American Moto Products, Inc., Laguna Hills, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/924,230

[22] Filed: Sep. 5, 1997

Related U.S. Application Data

[63] Continuation of application No. 08/651,921, May 21, 1996, Pat. No. 5,700,047.

[51] Int. Cl.⁷ ........................................................ B60P 3/40
[52] U.S. Cl. ...................... 296/26.11; 296/57.1; 224/404; 224/506
[58] Field of Search ................................. 296/26.1, 27.1, 296/37.6, 50, 56, 57.1; 224/402, 403, 497, 496, 314, 404, 493, 505–506, 572

[56] References Cited

U.S. PATENT DOCUMENTS

| | | | |
|---|---|---|---|
| D. 160,213 | 9/1950 | Samuelson | D12/406 |
| D. 291,789 | 9/1987 | Noga | D12/414 X |
| D. 300,734 | 4/1989 | Kruitbosch | D12/414 |
| D. 326,076 | 5/1992 | Wiese | D12/406 |
| D. 365,323 | 12/1995 | Napierkowski et al. | D12/414 |
| 1,242,035 | 10/1917 | Pierson et al. . | |
| 1,266,521 | 5/1918 | Norquist . | |
| 1,272,620 | 7/1918 | Carlson . | |
| 1,289,997 | 12/1918 | Wyeth . | |
| 1,655,777 | 1/1928 | Weiland . | |
| 1,655,797 | 1/1928 | Peck | 224/505 |
| 1,764,615 | 6/1930 | Edwards . | |
| 2,621,357 | 12/1952 | Stuman | 16/114 |
| 2,626,179 | 1/1953 | Gonzalez . | |
| 2,720,414 | 10/1955 | Hart . | |
| 2,795,363 | 6/1957 | Turner . | |
| 3,902,599 | 9/1975 | Stromberg . | |
| 4,023,850 | 5/1977 | Tillery . | |
| 4,136,905 | 1/1979 | Morgan | 296/50 |
| 4,419,794 | 12/1983 | Horton, Jr. et al. . | |
| 4,451,075 | 5/1984 | Canfield | 296/37.6 |

(List continued on next page.)

FOREIGN PATENT DOCUMENTS 0629098  9/1978  U.S.S.R. .

*Primary Examiner*—Dennis H. Pedder
*Attorney, Agent, or Firm*—Knobbe, Martens, Olson & Bear, LLP

[57] ABSTRACT

An improved truck bed extender particularly adapted for ease of installation and removal. When not being used to extend the truck bed, the extender is advantageously adapted to quickly and easily create a secondary storage area. In one embodiment, the extender includes a first side wall, a second side wall, a connecting wall, a first mount and a second mount. The connecting wall extends between the first side wall and the second side wall, and cooperates with the first side wall and second side wall to form a generally U-shape frame. The first mount is secured to the first side wall and includes a first interlocking member. The second mount is secured to the second side wall and comprises a second interlocking member. The first interlocking member and the first mounting station on the vehicle and the second interlocking member and the second mounting station on the vehicle cooperate to secure the truck bed extender to the vehicle so that the extender is rotatable about an axis between a first and a second position. In the first position, the connecting wall is in an upright position over the tailgate beyond the rear end of the bed. In the second position, the connecting wall is in an upright position spaced forward from the rear end of the bed and the tailgate.

13 Claims, 4 Drawing Sheets

U.S. PATENT DOCUMENTS

| | | |
|---|---|---|
| 4,470,716 | 9/1984 | Welch . |
| 4,472,639 | 9/1984 | Bianchi . |
| 4,531,773 | 7/1985 | Smith . |
| 4,596,417 | 6/1986 | Bennett ................................ 296/61 |
| 4,635,992 | 1/1987 | Hamilton ........................ 296/37.6 |
| 4,652,035 | 3/1987 | Austin, Jr. ........................ 296/56 X |
| 4,749,226 | 6/1988 | Heft ................................ 296/37.6 |
| 4,750,773 | 6/1988 | Chapline ........................ 296/37.6 |
| 4,778,213 | 10/1988 | Palmer . |
| 4,786,119 | 11/1988 | Smuda . |
| 4,824,158 | 4/1989 | Peters et al. .................... 296/37.6 |
| 4,828,312 | 5/1989 | Kinkel ............................ 296/37.6 |
| 4,830,242 | 5/1989 | Painter . |
| 5,024,409 | 6/1991 | Bohnen ........................... 248/222.4 |
| 5,037,153 | 8/1991 | Stark .............................. 296/37.6 |
| 5,083,829 | 1/1992 | Fonseca .......................... 296/37.6 |
| 5,114,203 | 5/1992 | Carnes ............................ 296/50 |
| 5,123,691 | 6/1992 | Ginn .............................. 296/37.1 |
| 5,147,103 | 9/1992 | Ducote ............................ 296/37.6 |
| 5,154,470 | 10/1992 | Bringman, Jr. .................. 296/57.1 X |
| 5,169,200 | 12/1992 | Pugh .............................. 296/37.6 |
| 5,201,562 | 4/1993 | Dorsey ............................ 296/39.2 |
| 5,253,913 | 10/1993 | Metivier .......................... 296/37.6 |
| 5,468,038 | 11/1995 | Sauri .............................. 296/57.1 |
| 5,622,296 | 4/1997 | Pirhonen et al. . |
| 5,658,033 | 8/1997 | Delaune ........................ 296/57.1 X |
| 5,700,047 | 12/1997 | Leitner et al. .................. 296/26 |
| 5,730,342 | 3/1998 | Tien .............................. 224/271 |
| 5,743,589 | 4/1998 | Felker ............................ 296/180.5 |
| 5,752,800 | 5/1998 | Brincks et al. .................. 414/537 |
| 5,755,480 | 5/1998 | Bryan ............................ 296/57.1 X |
| 5,765,892 | 6/1998 | Covington .................... 296/57.1 X |
| 5,775,759 | 7/1998 | Cummins ...................... 296/57.1 X |
| 5,806,907 | 9/1998 | Martinus et al. .............. 296/26.11 |
| 5,820,188 | 10/1998 | Nash ............................ 296/57.1 X |
| 5,853,116 | 12/1998 | Schreiner ...................... 224/404 |
| 5,857,724 | 1/1999 | Jarman .......................... 296/57.1 |

TRUCK BED EXTENDER

This application is a continuation of Ser. No. 08/651,921 now U.S. Pat. No. 5,700,047.

FIELD OF THE INVENTION

This invention relates to an improved truck bed extender and, in particular, to a truck bed extender particularly adapted for ease of installation and removal.

BACKGROUND OF THE INVENTION

Pick-up trucks are extremely popular. One of their primary advantages is the ability to haul loads in the storage bed located behind the cab of the vehicle. Unfortunately, often the storage bed is of an undesirable configuration for the load being transported. In particular, it is not unusual for the load to be larger than the truck bed, so that the tailgate of the truck needs to be lowered to enable the load to adequately transferred. Unfortunately, this raises the risk that the load will fall out of the back of the truck, or that the load will need to be tied down, taking additional time.

For this reason, various truck bed extenders have been developed. These extenders are typically mounted to the truck bed by brackets or hinges. Truck bed extenders often comprise a series of light weight panels designed to be foldable to minimize their impact on storage space when not in use, as is shown in U.S. Pat. No. 4,472,639 to Bianchi. Alternatively, the truck bed extenders may comprise strong, but relatively heavy and nonfoldable units, such as disclosed in U.S. Pat. No. 4,778,213 to Palmer. Palmer discloses extended side supports secured to the tailgate by brackets or welding and a supplemental tailgate. When the main tailgate is closed, the supplemental tailgate extends over the top of the vehicle's storage bed. It is disclosed that a flexible netting may be secured to the right and left supports so that the netting extends in a vertical plane to form a storage box.

There remains, however, a need for an improved truck bed extender.

SUMMARY OF THE INVENTION

The present invention is an improved truck bed extender which is particularly adapted for ease of installation and removal. When not being used to extend the truck bed, the extender is advantageously adapted to quickly and easily create a secondary storage area. Another aspect of the invention is a method for utilizing a truck bed extender.

One aspect of the invention is a truck bed extender for use with a vehicle having an open storage bed having a rear end, a first upstanding side panel to one side of the bed, a second upstanding side panel to an opposite side of the bed, and a tailgate, wherein the first upstanding panel defines a first mounting station and the second upstanding panel defines a second mounting station. The extender has a first side wall, a second side wall, a connecting wall, a first mount and a second mounting mount. The connecting wall extends between the first side wall and the second side wall, and cooperates with the first side wall and second side wall to form a generally U-shaped frame. The first mount is secured to the first side wall and includes a first interlocking member. The second mount is secured to the second side wall and comprising a second interlocking member. The first interlocking member and the first mounting station and the second interlocking member and the second mounting station cooperate to secure the truck bed extender to the vehicle so that the extender is rotatable about an axis between a first position and a second position. In the first position, the connecting wall is in an upright position over the tailgate rearward of the rear end of the bed. In the second position, the connecting wall is in an upright position spaced forward from the rear end of the bed and the tailgate.

Advantageously, the first mounting station comprises a first aperture and the second mounting station comprises a second aperture and the first interlocking member is a retractable male member sized and shaped to be received and retained within the first aperture and the second interlocking member is a retractable male member sized and shaped to be received and retained within the second aperture. An important aspect of the invention is that the connecting wall desirably comprises at least two interconnecting sections which are slidable relative one another permitting the horizontal span of the connecting wall to be adjusted to correspond to the particular width of the truck bed. Effective truck bed widths can vary between manufacturers and vary depending on whether a truck bed protector has been installed. Advantageously, the extender's adjustability desirably permits the identical extender to be used with most truck beds, at least in a given size classification.

The extender may also comprise a first L-shaped section defining the first side wall and a first portion of the connecting wall and a second L-shaped section defining the second side wall and a second portion of the connecting wall. Advantageously, these L-shaped portions significantly increase the strength and rigidity of the extender, enhancing its ability to withstand bumping by heavy cargo, such as motorcycles, as well as external impact.

Yet another important aspect of the invention is at least one buckle secured to one of the walls sized and shaped to be releasably locked to the latch of the vehicle tailgate. Significantly, the buckle provides a supplemental attachment point which minimizes movement and vibration of the extender while driving and is quickly releasable by using the vehicle tailgate's own opening mechanism.

Another aspect of the invention is a truck bed extender for use with a vehicle having a storage bed. The extender includes a first side wall, a second side wall, a connecting wall, a first mount and a second mount. The connecting wall extends between the first wall and the second wall and cooperates with the first wall and second wall to form a general U-shaped frame. The first mount is secured to the first side wall and includes a first interlocking member. The second mount is secured to the second wall and includes a second interlocking member. The extender is securable to the vehicle through cooperation of the first interlocking member and the first mounting station and the second interlocking member and the second mounting station in a first position wherein the connecting wall is in an upright position over the tailgate rearward of the rear end of the storage bed and a second position wherein the connecting wall is in an upright position spaced forward from the rear end of the bed and the tailgate.

Yet another important aspect of the invention is a truck bed extender for use with a vehicle having a first side panel defining a first forward mounting station and a first rearward mounting station, and a second panel defining a second forward mounting station and a second rearward mounting station, wherein the extender includes a first side wall, a second side wall, a connecting wall, a first mount and a second mount. The connecting wall extends between the first side wall and the second side wall, and cooperates with the first side wall and the second side wall to form a generally U-shaped frame. The first mount is secured to the first side wall and includes a first interlocking member. The second mount is secured to the second side wall and comprises a second interlocking member. The extender is securable to the vehicle through cooperation of: (1) the first interlocking member and the first forward station and the second interlocking member and the second forward station in a first position wherein the first side wall and the second side wall extend forward of the connecting wall and the connecting wall is in an upright position spaced rearward from the front panel, and (2) the first interlocking member and the first rearward station, and the second interlocking member and the second rearward station in a second position wherein the connecting wall is in an upright position spaced rearward from the rear end of the bed over the tailgate.

Desirably, the extender is also securable to the vehicle through cooperation of the first interlocking member and the first rearward station and the second interlocking member and the second rearward station in a third position, wherein the connecting wall is in an upright position spaced forward from the rear end of the bed and the tailgate.

BRIEF DESCRIPTION OF THE DRAWINGS

These and other features of the invention will now be described in connection with the accompanying drawings, in which.

DETAILED DESCRIPTION OF THE PREFERRED EMBODIMENT

Figure 1:
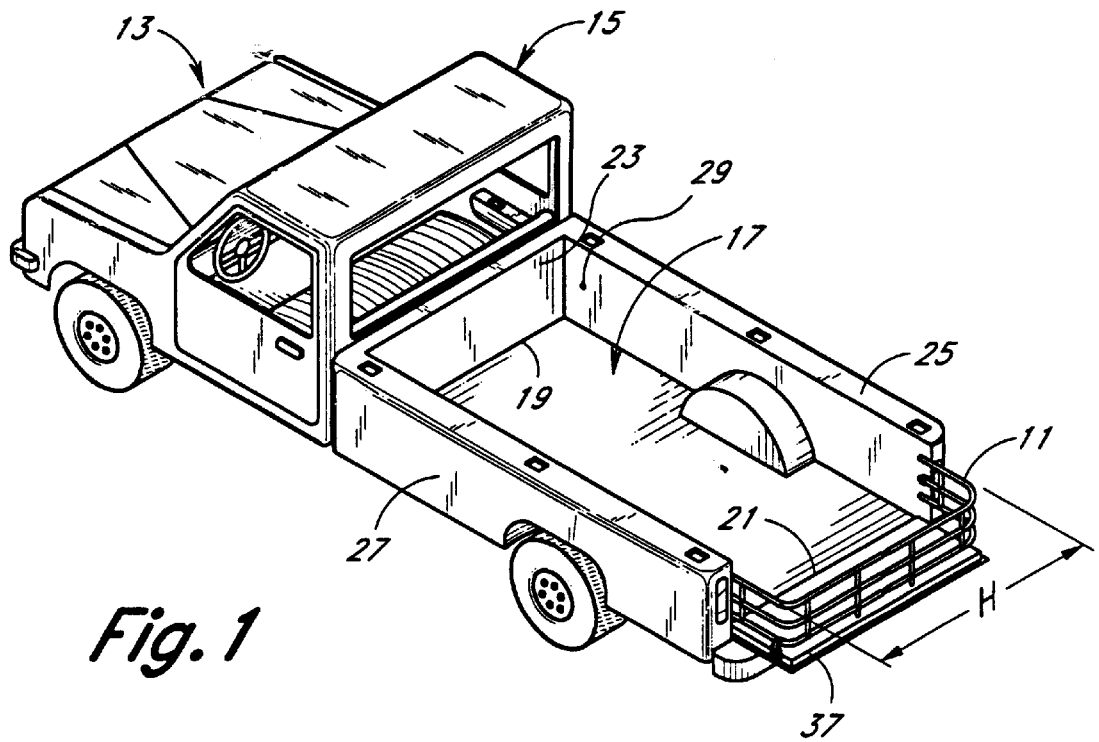
FIG. 1 is a perspective view of a preferred embodiment of the truck bed extender of the present invention mounted on a vehicle in a first position.
Figure 2:
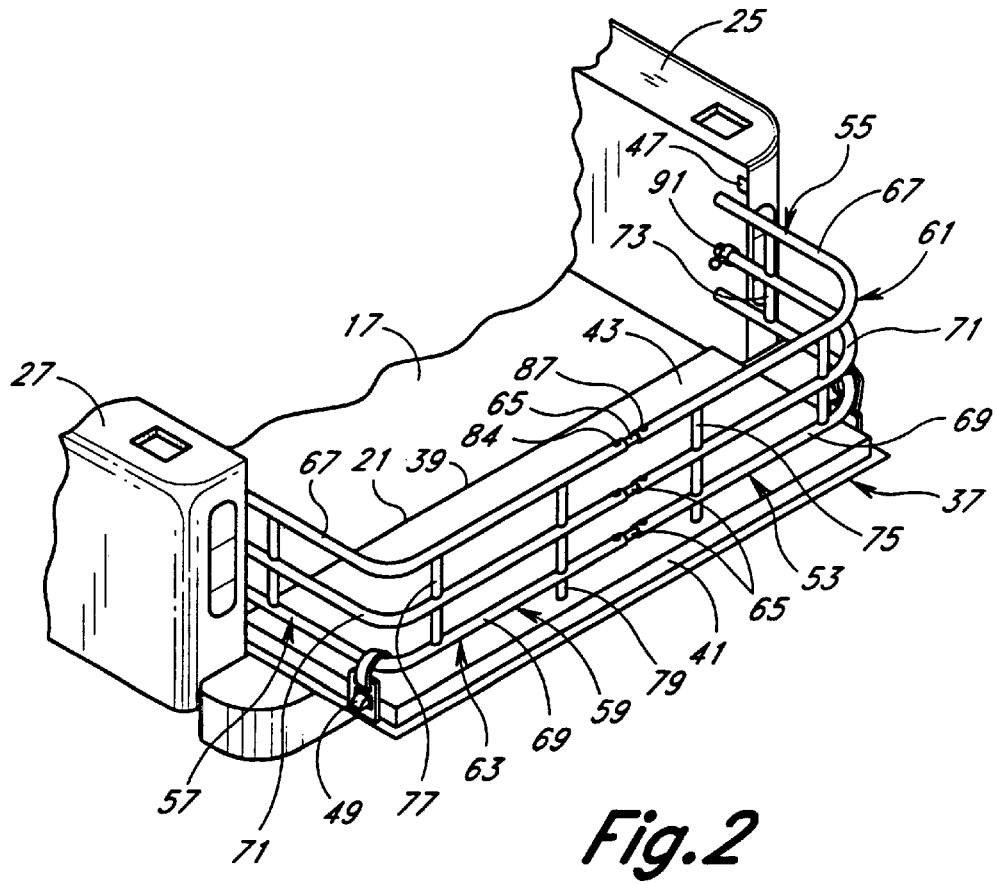
FIG. 2 is a enlarged partial perspective view of the vehicle and truck bed extender of FIG. 1.
Figure 3:
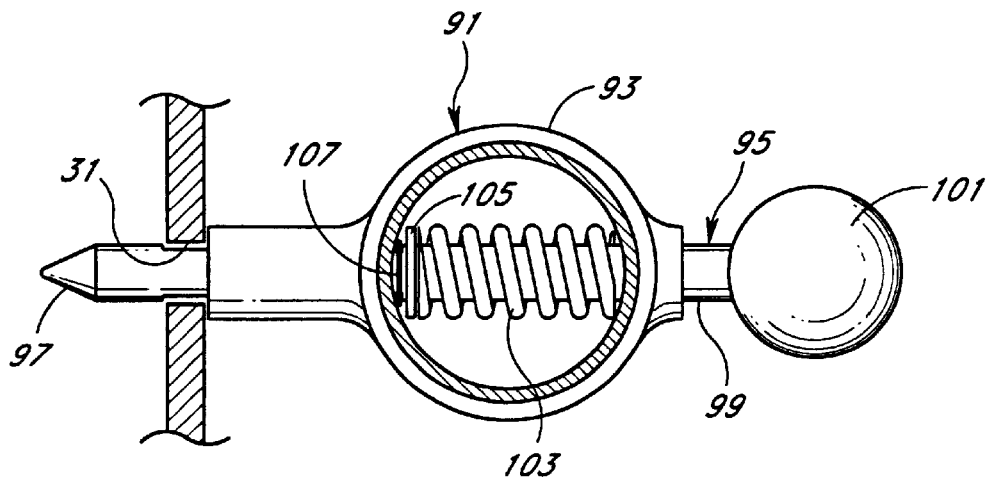
FIG. 3 is an enlarged sectional view of the mount of the truck bed extender of FIG. 1.

The preferred embodiment of a multi-purpose apparatus or truck bed extender 11 will now be described with reference to the figures. Referring to FIGS. 1 and 2, the truck bed extender 11 is shown mounted on a truck 13 having a cab 15 to the rear which is a storage bed 17. The storage bed 17 has a front end 19 and a rear end 21. The front end 19 of the storage bed is defined by a front upstanding panel 23 and the sides of the storage bed are defined by a first side upstanding panel 25 and a second side upstanding panel 27. The first side upstanding panel 25 defines a first forward station or aperture 29 and a first rearward aperture 31 (FIG. 3), the purpose and location of which will be discussed in greater detail below. Likewise, the second side upstanding panel 27 defines a first forward aperture (not shown) and a second forward aperture (not shown).

At the rear end 21 of the storage bed 17 is a tailgate 37. The tailgate has a hinge end 39 and a distal end 41. The tailgate 37 defines a planar inner surface 43 extending between the hinge end 39 and distal end 41 of the tailgate. The tailgate 37 further comprises a first lock mechanism (not shown) which mates with a first latch 47 mounted on the rear end of the first upstanding panel 23. A tailgate 37 further includes a second lock mechanism 49 which interlocks with a second latch (not shown) mounted on the second side upstanding panel 27. The first lock mechanism and second lock mechanism 49 are selectably releasable by means of a release actuator (not shown) mounted at the outer surface of the distal end of the tailgate.

The truck bed extender 11 includes a frame 53 having a first side wall 55, a second side wall 57 and a connecting wall 59 extending between the first side wall 55 and second side wall 57. The frame 53 and, therefore, the connecting wall 59 define a horizontal span H which is slightly less than the distance between the first side upstanding panel 25 and second side upstanding panel 27 of the truck 13. The frame 53 is formed by a first L-shaped section 61, a second L-shaped section 63 and a plurality of connecting sections 65.

Both L-shaped sections 61, 63 comprise a generally L-shaped upper cross-beam 67, a generally L-shaped lower cross-beam 69 and a generally L-shaped middle cross-beam 71. Advantageously, each cross-beam comprises a single piece of 1.5 inch outer diameter, 0.058 inch wall thickness, 6061-T6 aluminum tubing.

The cross-beams 67, 69 and 71 are advantageously connected by an outer vertical strut 73, an inner vertical strut 75 and a middle vertical strut 77. The struts 73, 75, 77 desirably extend through mating openings in the cross-beams 67, 69, 71 and comprise one inch outer diameter, 0.058 inch wall thickness, 6061-T6 aluminum tubing. The use of angled aluminum tubing provides for high strength, low weight and ease of manufacture.

As shown in FIG. 2, the inner strut 75 and middle strut 77 are desirably positioned along the connecting wall 59 and the outer strut 73 is desirably positioned along the distal end of the side wall. Advantageously, the inner strut 75 is longer than the other struts and projects downward from the lower crossbeam 69 so as to define an inner strut foot 79.

The first L-shaped section 61 and second L-shaped section 63 are connected by the plurality of connecting sections 65. Specifically, there is an upper connecting section, a lower connecting section and a middle connecting section. Desirably, the connecting sections comprise a 7 inch long, 1⅜ inch outer diameter, 0.058 inch wall thickness, 6061-T6 aluminum tube. The connecting sections are slidable within and, desirably forms a slip-fit with, the first L-shaped section 61 and second L-shaped section 63, and are each desirably locked in place by a pair of locking screws 87.

Approximately ⅝ inch from the outer end of each middle crossbeam 71 is a 0.328 inch diameter horizontal bore mounted over the middle crossbeam 71 aligned with the bore is a mount 91 having a body 93 which defines a throughbore. The body has an annular middle portion with generally diametrically opposed cylindrical projections corresponding to the throughbore. The mounts 91 are secured respectively to the first L-shaped section and second L-shaped section so that the throughbores are coaxially aligned. The mount 91 further includes a generally cylindrical male member 95 having a cone-shaped engagement end 97 and an actuating end 99. A handle 101 is threaded on the actuating end 99 and the male member 95 is mounted for reciprocal movement within the body by a spring 103 surrounding the male member within the body 93 of the mount. The precompressed spring desirably has one end biased against the body 93 of the mount and another end which is biased against a washer 105 which is secured against outward movement relative the male member 95 by a C clip 107.

Figure 4:
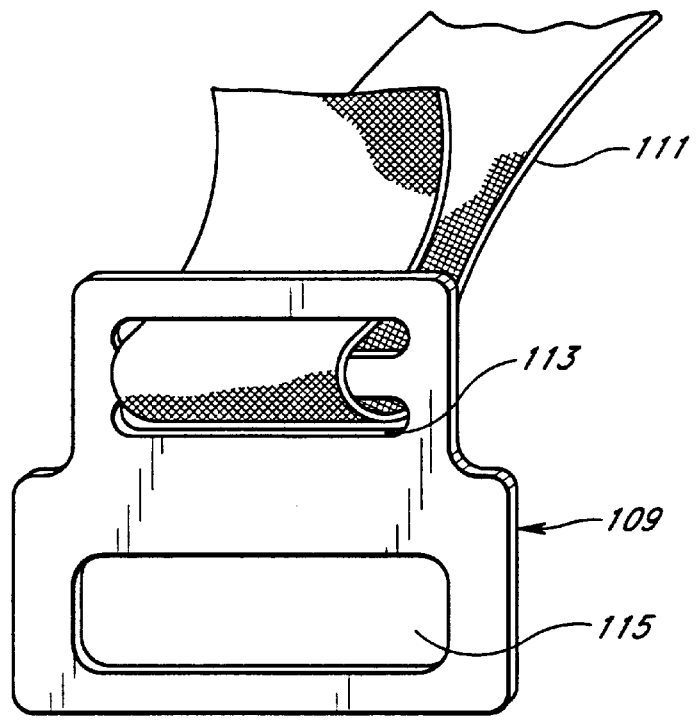
FIG. 4 is an enlarged perspective view of a belt and buckle locking device of the truck bed extender of FIG. 1.

Referring now to FIG. 2, a buckle 109 is secured to each of the lower crossbeams 69 by means of a strap 111. As shown in FIG. 4, the buckle 109 is generally rectangular with a narrower upper portion and a wider lower portion. The buckle 109 desirably forms a pair of parallel slots 113 for receiving the strap 111 and a larger opening 115 for mating with one of the lock mechanisms 49 of the vehicle.

The installation and operation of the truck bed extender 11 will now be described.

When it is desired to ready a vehicle for use with the truck bed extender 11, the truck bed extender 11 can be placed in the desired position on the tailgate 37 so that the distal end of the first side wall 55 and distal end of the second side wall 57 extend along the inner surface of the rear end of the first side upstanding panel 25 and the second side upstanding panel 27, respectively. When the truck bed extender 11 is in the desired position, its width can be adjusted by sliding the first or second L-shaped sections 61 and 63 relative the connecting section 65 and securing it in position by means of one of the locking screws 87. Once the extender 11 has been adjusted so that it has the desired horizontal span H, the handle 101 of each of the mounts 91 can be pressed outward so that the engagement end 97 of the male member 95 presses hard against the respective first side upstanding panel 25 and second side upstanding panel 27 to mark the location for drilling the first rearward aperture 31 and second rearward aperture 35. This approach eliminates difficulties in determining the proper position of the apertures 31 and 35. Once the first rearward aperture 31 and second rearward aperture 35 are drilled into the first side upstanding panel 25 and second side upstanding panel 27, respectively, the truck bed extender 11 is ready for operation. Importantly, no additional brackets or modifications are required, so that when the truck bed extender is not in use, there are no brackets in the way, and virtually no cosmetic change to the appearance of the truck 13.

In use, the truck bed extender is simply positioned on the tailgate 37 so that the engagement ends 97 of the mounts 91 extend through the respective first rearward aperture 31 and second rearward aperture (not shown). In this position, the truck bed extender provides a strong, secure retaining device while the openings between the respective crossbeams and struts permit the flow of air to minimize air resistance. If it is desired to remove the truck bed extender 11, the handles 101 secured to each of the male members 95 are simply pulled inward causing engagement ends 97 of the male members 95 to retract from the first rearward aperture 31 and second rearward aperture 35 and the truck bed extender can be removed.

The truck bed extender can be further secured against undesired rotation about the mounts 91 by means of the buckle 109 and strap 111, by simply securing the buckles 109 in the first lock mechanism (not shown) and second lock mechanism 49, respectively, of the tailgate 37. Advantageously, the buckles are configured so that they are secured in place by the lock mechanisms and are selectably releasable by the tailgate's own release actuator.

Figure 5:
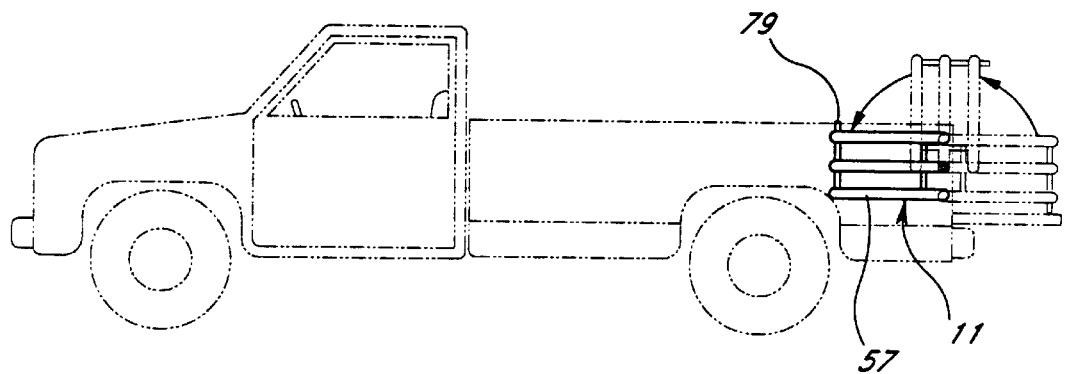
FIG. 5 is a partial sectional view illustrating the pivoting of the truck bed extender of FIG. 1 from a first position (shown in phantom) to a second position.
Figure 6:
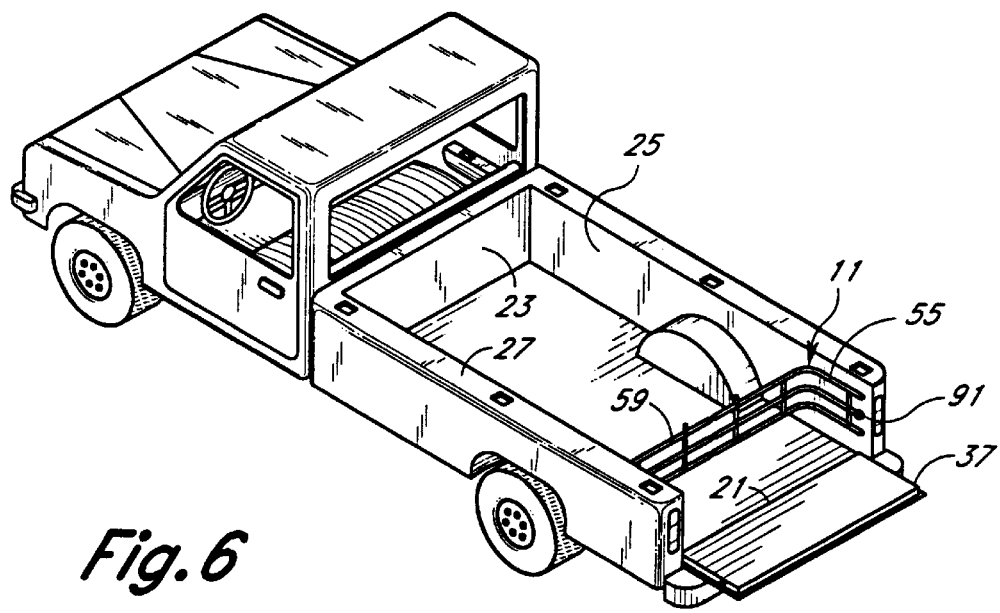
FIG. 6 is a top plan view of the truck bed extender and vehicle of FIG. 1 in a second position.

Importantly, in the event it is desired to use the truck bed extender 11 to form a rear storage compartment, as shown in FIG. 5, the truck bed extender can be quickly and easily pivoted about the coaxial male members 95 so that the connecting wall 59 is in a vertical position spaced inward from the rear end 21 of the storage bed 17 and, therefore, the tailgate 37. In this position, the truck bed extender 11 provides a convenient open upper-ended storage compartment to secure grocery bags or other items against movement within the truck bed.

Advantageously, the truck bed extender 11 is extremely strong, but at the same time lightweight. In addition, because its structural configuration lends itself to construction with a minimum of parts, the extender can be manufactured at a relatively low cost.

Figure 7:
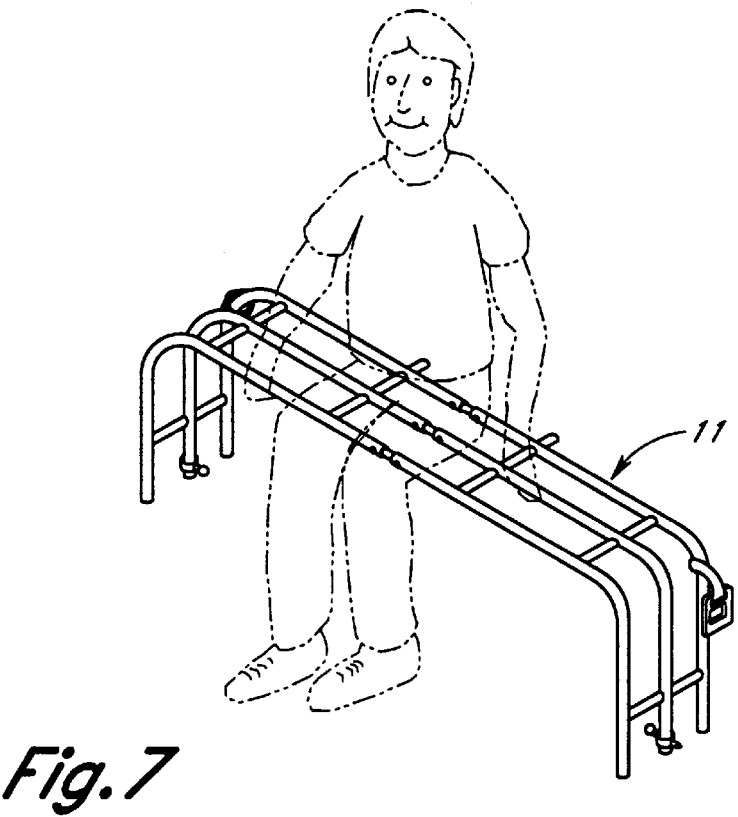
FIG. 7 is a perspective view of the truck bed extender of FIG. 1 illustrating its use as a bench.

Advantageously, as shown in FIG. 7, the truck bed extender provides a convenient work or picnic bench when it is removed from the vehicle. Specifically, when the distal ends of the first side wall 55 and second side wall 57 are placed on the ground, one or more individuals can sit on the connecting wall 59.

Figure 8:
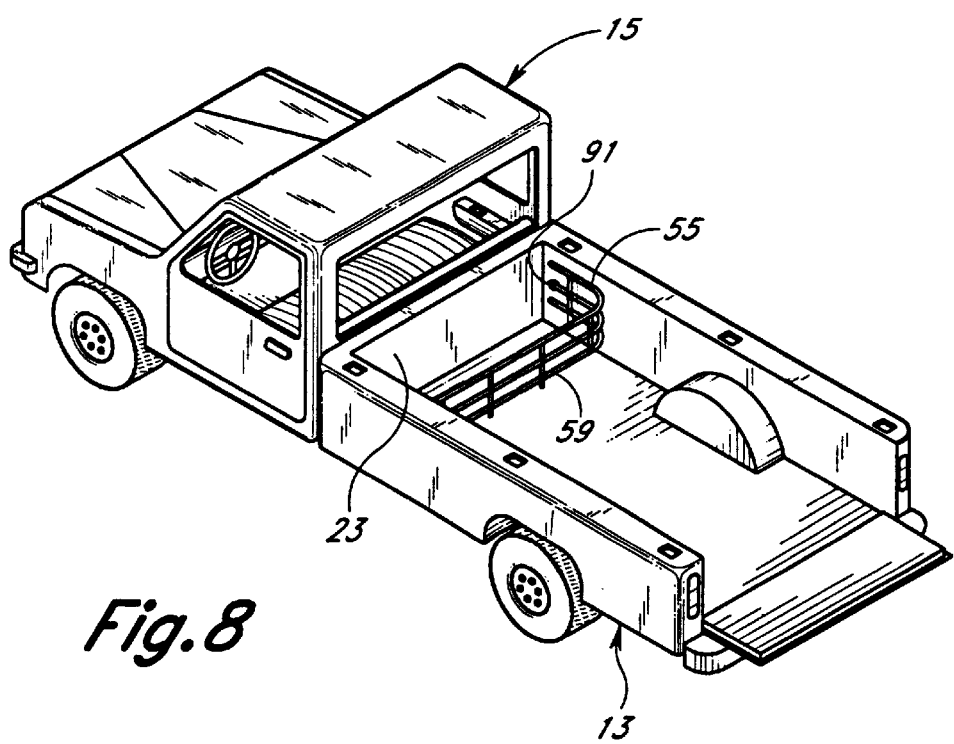
FIG. 8 is a perspective view of the truck bed extender and vehicle of FIG. 1 showing the truck bed extender in a third position.

Finally, as shown in FIG. 8, the truck bed extender 11 is also capable of forming a forward storage compartment adjacent the cab 15 of the truck 13. Such a position is often desirable when transporting pets, due to the proximity to the driver and the wind resistance afforded by the cab 15. If it is desired to use the truck bed extender to form such a forward storage compartment, a first forward aperture 29 and a second forward aperture (not shown) are desirably formed in the first side upstanding panel 25 and second side upstanding panel 27, respectively by locating and drilling the apertures in a manner similar to that of the rearward apertures 31 and 35. It is then a simple matter to place the truck bed extender 11 in position so that the first side wall 55 and second side wall 57 extend forward from the connecting wall so that the connecting wall 59 is spaced rearward from the front upstanding panel 23 of the truck 13. Again, removal is easily accomplished by simply pulling the handles 101 inward so that engagement ends 97 the male members 95 are retracted within the mounts 91 so that they are withdrawn from the first forward aperture 29 and second forward aperture (not shown).

While the invention has been described with reference to a preferred embodiment, many variations are possible and those of skill in the art will appreciate various modifications within the scope and spirit of the invention.

What is claimed is:

1. A truck bed extender for use with a vehicle having an open storage bed having a rear end, a first upstanding side panel to one side of said bed having an inner side, a second upstanding side panel to an opposite side of said bed having an inner side and a tailgate, a first mounting station fixed with respect to said first upstanding panel defining a first station surface, a second mounting station fixed with respect to said second upstanding panel defining a second station surface, said apparatus comprising:

a first side wall;
   a second side wall;
   a connecting wall extending between said first side wall and said second side wall, said first side wall, said second side wall and said connecting wall cooperating to form a generally U-shaped frame;
   a first mount secured to said first side wall comprising a first interlocking member defining a first pivot surface; and
   a second mount secured to said second side wall comprising a second interlocking member defining a second pivot surface, said first station surface and said first pivot surface, and said second station surface and said second pivot surface cooperating to secure said apparatus to said vehicle so that said apparatus is rotatable about an axis between a first position wherein said connecting wall is in an upright position over said tailgate rearward of said rear end of said bed and a second position wherein said connecting wall is in an upright position spaced forward from said rear end of said bed, and wherein one of said first station surface and said first pivot surface defines a first opening through which the other of said first station surface and said first pivot surface can be manually withdrawn from said inner side of said first panel to disengage said extender from said first panel and one of said second station surface and said second pivot surface defines a second opening through which the other of said second station surface and said second pivot surface can be manually withdrawn from said inner side of said second panel to disengage said extender from said second panel.

2. The extender of claim 1, wherein said tailgate defines a latch to secure said tailgate to one of said first upstanding side and said second upstanding side, said truck bed extender further comprising at least one buckle secured to one of said walls, sized and shaped to be releasably captured by said latch of said tailgate.

3. The truck bed extender of claim 2, wherein said connecting wall defines a horizontal span and comprises at least two sections which are slidable relative one another permitting said horizontal span to be adjusted.

4. The truck bed extender of claim 2, further comprising a first L-shaped section comprising said first side wall and a first portion of said connecting wall and a second L-shaped section comprising said second side wall and a second portion of said connecting wall.

5. The truck bed extender of claim 1, wherein said connecting wall defines a horizontal span and comprises at least two sections which are slidable relative one another permitting said horizontal span to be adjusted.

6. The truck bed extender of claim 1, further comprising a first L-shaped section comprising said first side wall and a first portion of said connecting wall and a second L-shaped section comprising said second side wall and a second portion of said connecting wall.

7. The truck bed extender of claim 1, wherein said extender includes a first cross-beam comprising metal tubing.

8. The truck bed extender of claim 7, wherein said first mount includes a body defining a throughbore through which said first cross-beam extends.

9. The truck bed extender of claim 8, further comprising a second cross-beam and a vertical strut connecting said first cross-beam and said second cross-beam.

10. The truck bed extender of claim 9, wherein said first interlocking member is retractable into said body.

11. The truck bed extender of claim 1, wherein said extender includes a first cross-beam and said first mount includes a body defining a throughbore through which said first cross-beam extends.

12. The truck bed extender of claim 11, further comprising a second cross-beam and a vertical strut connecting said first cross-beam and said second cross-beam.

13. The truck bed extender of claim 11, wherein said first interlocking member is retractable into said body.

* * * * *